Oct. 1, 1935.          C. O. WOLD          2,015,880
                        ROAD MACHINE
              Filed Oct. 26, 1932     4 Sheets-Sheet 1
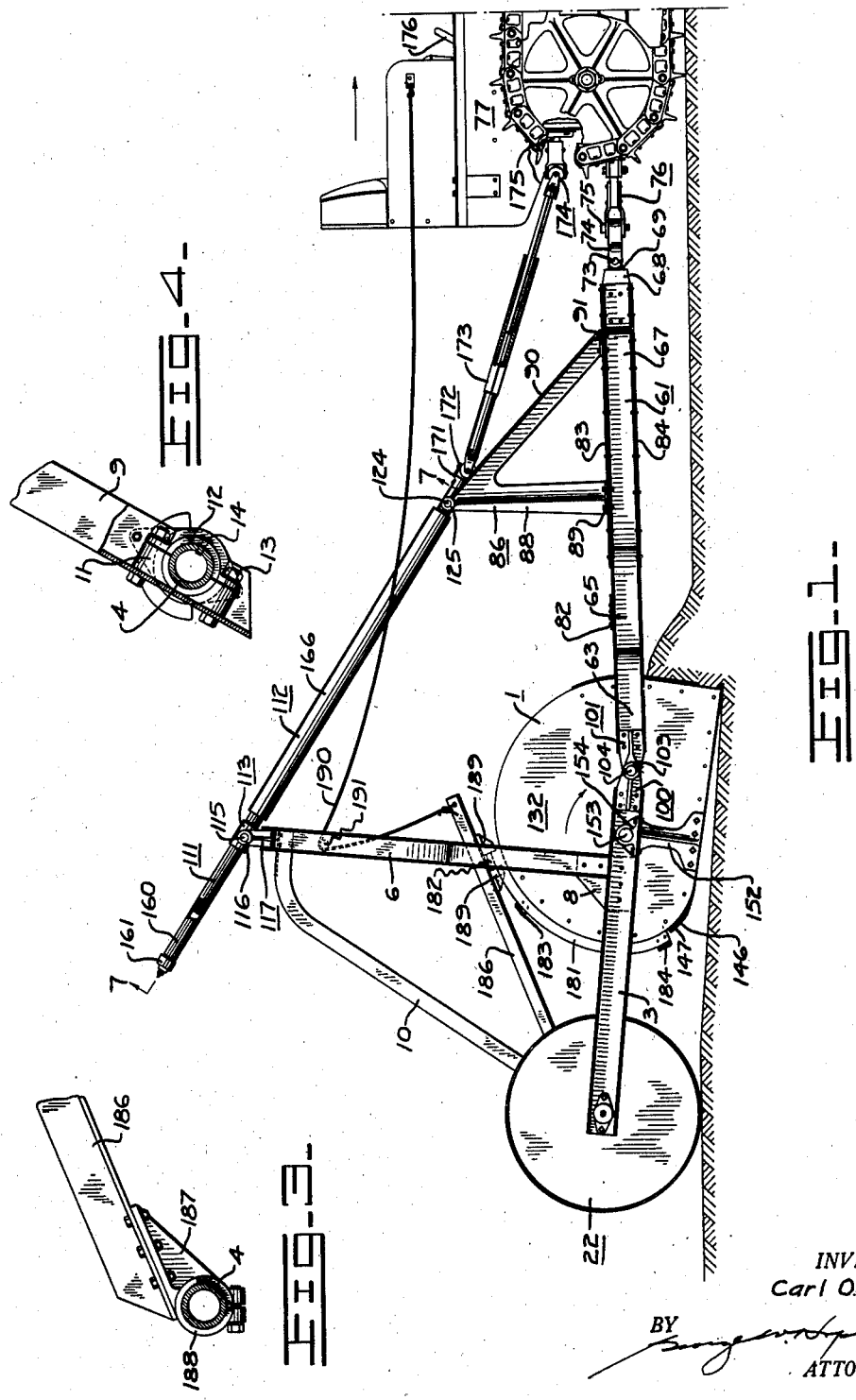
INVENTOR.
Carl O. Wold
BY
ATTORNEY.

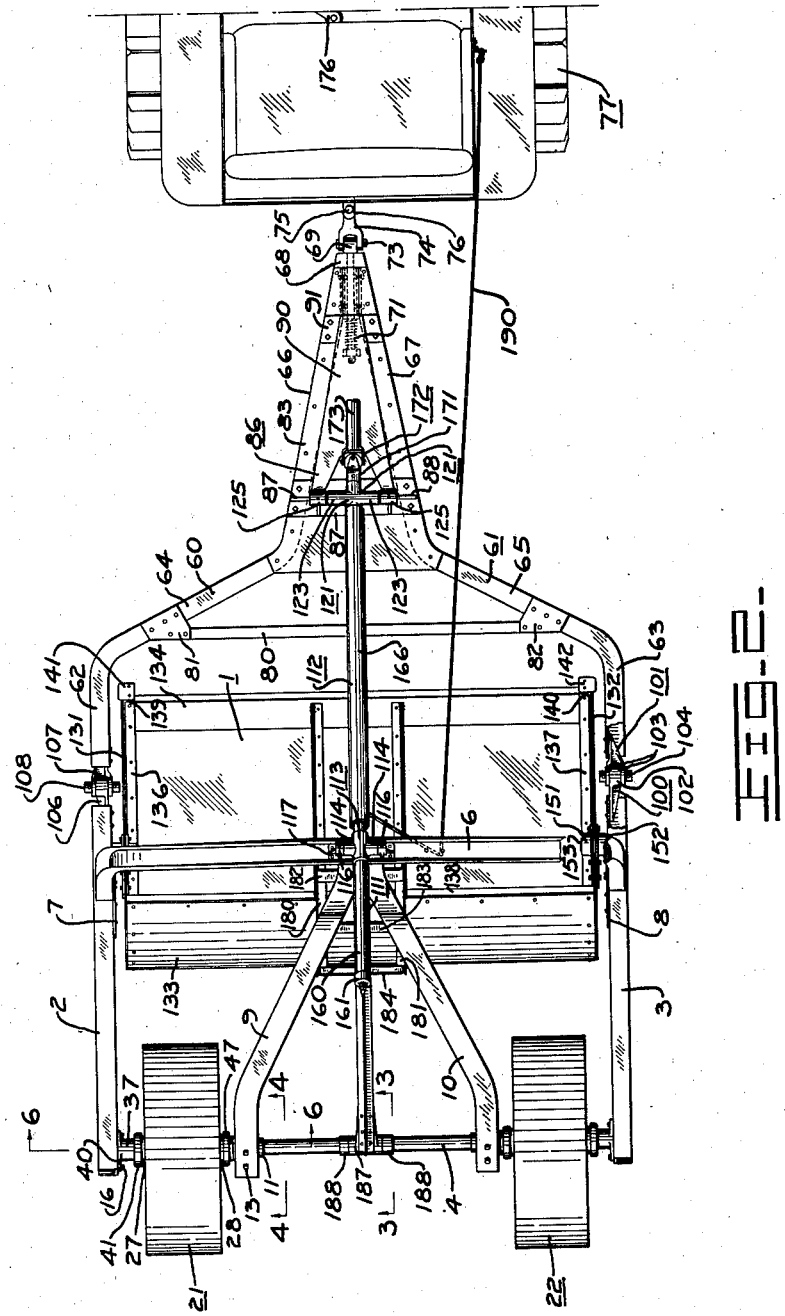

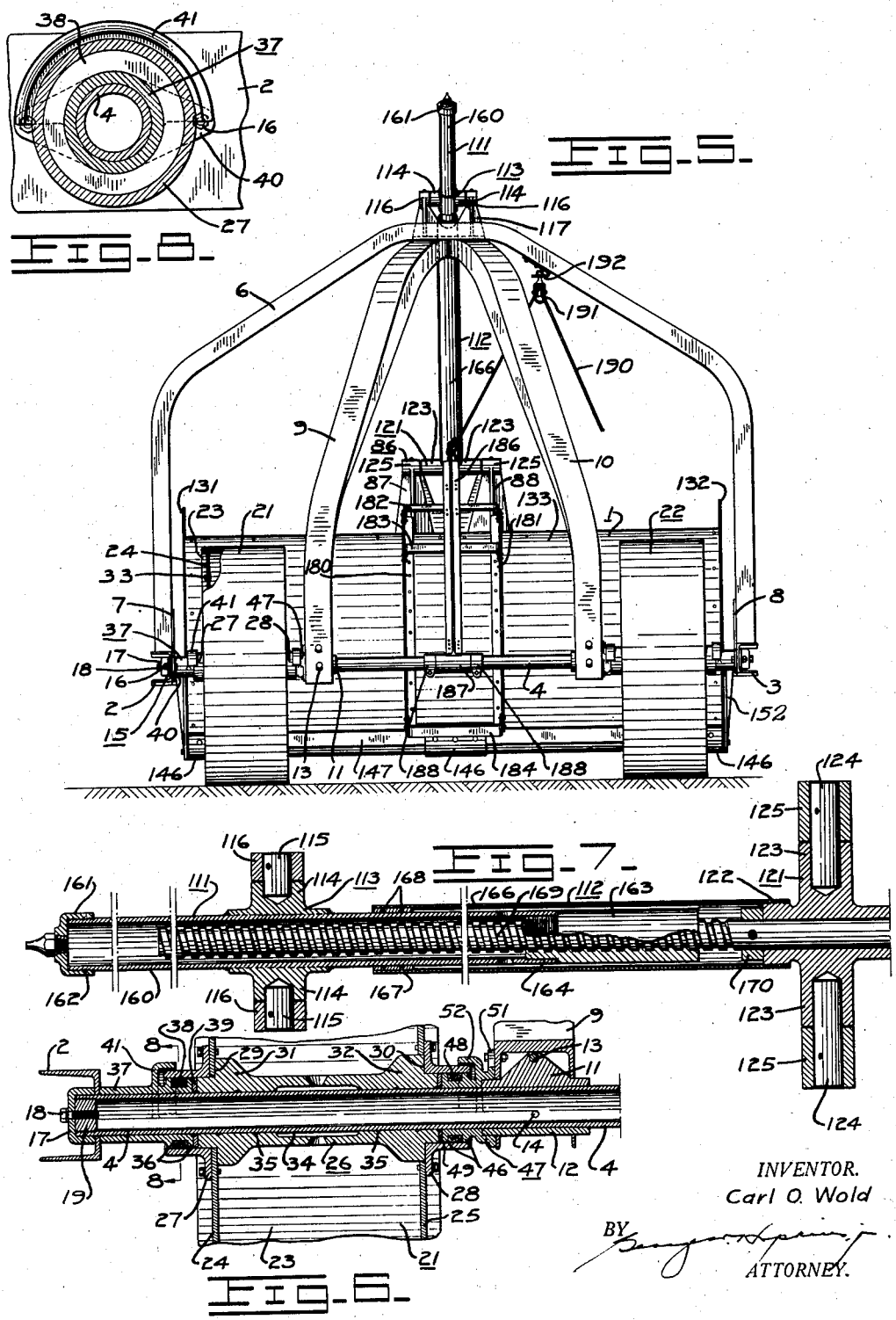

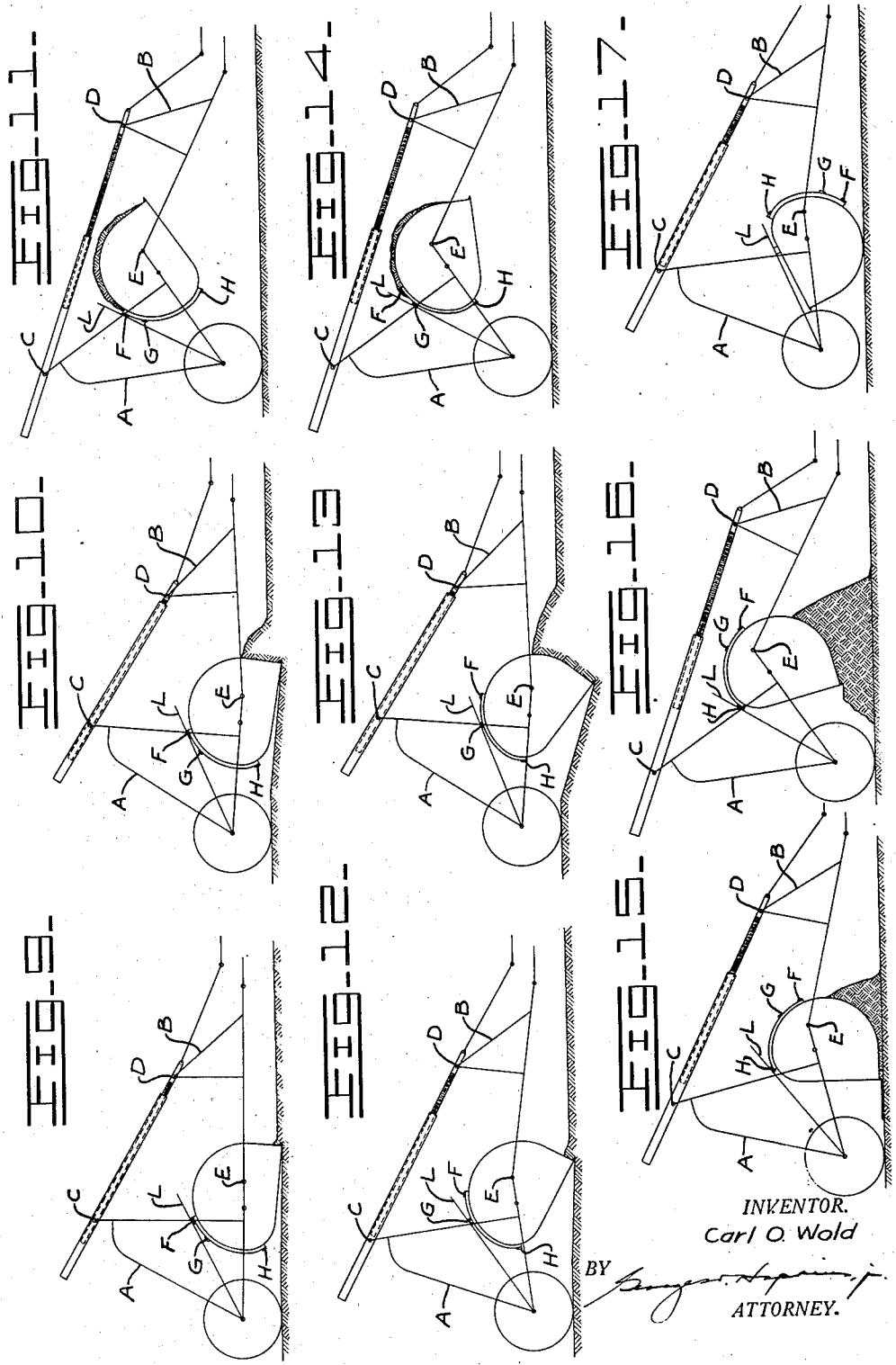

Patented Oct. 1, 1935

2,015,880

UNITED STATES PATENT OFFICE 2,015,880

ROAD MACHINE

Carl O. Wold, Minneapolis, Minn., assignor to Caterpillar Tractor Co., San Leandro, Calif., a corporation of California Application October 26, 1932, Serial No. 639,585

3 Claims. (Cl. 37—129)

The present invention relates to road machines, and particularly to wheeled scrapers adapted for use in earth moving work.

The machine is particularly designed to combine the most desirable features of known scrapers as well as presenting new and advantageous features. The scraper is mounted revolubly in a frame which is supported at its front end on the tractor and at its rear end on wheeled supports. The scraper is positioned in front of the wheels which therefore travel on the surface planed by the scraper to maintain the scraper on an even keel. Furthermore the wheels can be made as wide as desired for work over soft ground without increasing the width of the entire machine. Work in soft ground is facilitated also as the wheels do not support the entire weight of the scraper and its load, part of which is carried by the tractor. Another advantage obtained from this arrangement of the scraper and wheels is that the scraper is wider in proportion to the total width of the entire machine and can therefore work closer to banks, fences, buildings, etc.

Another particularly advantageous feature is found in the method of control provided for positioning the scraper. The vertical adjustment is accomplished by raising and lowering the pivotal connection between the front and rear parts of the frame, the scraper being mounted adjacent this point. This not only permits a wide range of adjustment but provides a positive and accurate control of the vertical position of the scraper which is adjustable to make fine pickups and cuts of varying depth with the blade in maximum shearing position, as well as to dump the material in a pile or distribute it at a selected depth of spread. This vertical adjustment also permits the load to be carried on the wheels for long hauls, or dragged on the ground for short hauls. The scraper is mounted revolubly in the frame and can be latched in the most advantageous position for the particular type of work which is being performed.

It is an object of the invention to provide a wheeled scraper of a simplified and improved construction.

Another object of the invention is to provide a wheeled scraper construction in which the side members of the frame measure the total width, the scraper being made as wide as possible.

Another object of the invention is to provide a vertically adjustable scraper which is revoluble to vary the type of operation performed.

Another object of the invention is to provide a wheeled scraper having wide wheels which travel on the surface planed by the scraper.

Another object of the invention is to provide a wheeled scraper frame construction which is oscillable to adjust said scraper.

Another object of the invention is to provide a road working apparatus including a wheeled scraper and power-operated adjusting means therefor.

Another object of the invention is to provide power-operated adjusting means for moving a scraper from loading position to load-carrying or dumping position.

Another object of the invention is to provide an improved wheel construction for road machines.

Other objects will appear as the description progresses.

Description of figures

Fig. 1 is a side elevation of the machine.
Fig. 2 is a plan view of the machine.
Fig. 3 is a section on line 3—3 in Fig. 2.
Fig. 4 is a section on line 4—4 in Fig. 2.
Fig. 5 is a rear elevation of the machine.
Fig. 6 is a section on line 6—6 in Fig. 2.
Fig. 7 is a section on line 7—7 in Fig. 1.
Fig. 8 is a section on line 8—8 in Fig. 6.
Figs. 9–17 are diagrammatic views illustrating various operating positions of the scraper.

Description of machine

Scraper 1 (Fig. 1) is mounted revolubly in a frame comprising adjustably connected front and rear sections, the front section having a draft connection with a tractor or other traction device and the rear section being supported on wheels.

The rear section comprises side channels 2, 3 (Fig. 2), rear axle 4, and arched channel 6 (Fig. 5.) The ends of channel 6 (Figs. 2 and 5) are secured to side channels 2, 3 adjacent the forward ends thereof by gussets 7, 8, respectively. Brace channels 9, 10 are bolted to the central portion of channel 6 and diverge downwardly and rearwardly to rear axle 4. At its rear end (Fig. 4) said brace channel 9 has its walls cut away to receive bracket 11, which with cap 12 engages axle 4. Bolts 13 fasten cap 12 to bracket 11, and said bracket 11 to channel 9. Pin 14 passes through cap 12 and engages axle 4 to prevent movement of said axle with respect to channel 9 and the entire rear section of the frame, as well as to locate channel 9 laterally with respect to the axle. The rear end of side channel 2 is connected to the left end of axle 4 by means of bracket 15 (Fig. 5) bolted to said channel 2 by bolts 16, and said bracket has centrally formed cap 17 (Fig. 6) which fits over the end of axle 4 and is centrally apertured to receive cap screw 18 which has threaded engagement with plug 19 threaded in the end of axle 4. The rear end of side channel 3 is similarly connected to the right end of axle 4.

Wheels 21, 22 (Figs. 2 and 5) are mounted rotatably on rear axle 4 and as they are similarly constructed and mounted only one will be described in detail. Wheel 21 (Figs. 5 and 6) comprises cylindrical tire 23, centrally apertured disks 24, 25 welded thereto around their outer periphery, and a hub consisting of casting 26 (Fig. 6) and collars 27, 28 having their annular flanges bolted to said disks 24, 25 and seated in offset portions 29, 30 formed in enlarged portions 31, 32 at the ends of casting 26. The wheel is assembled by mounting collar 28 in offset 30, tire 23 and disks 24, 25 are then slipped over casting 26, disk 25 engaging enlarged portion 32 and being bolted to collar 28, while disk 24 engages offset 29 at the left end of casting 26. Collar 27 is then mounted, being bolted to disk 24. The entire wheel forms an oil chamber, oil plug 33 (Fig. 5) being provided in disk 24. Casting 26 (Fig. 6) is provided with central oil chamber 34 from which spiral grooves 35 formed in the bearing surface of the casting feed oil thereto. Said collar 27 is journaled on annular spaced ribs 36 of spacing collar 37, and seal 38 seated in said collar between said ribs engages collar 27 to prevent entry of foreign material. Thrust ring 39 is interposed between casting 26 and collar 37. Said collar 37 is provided with end flanges 40 (Fig. 8) which are bolted to channel 2 by bolts 16 which also serve to secure said channel 2 to axle 4 as previously described. Said collar 37 has overhanging shield 41 (Figs. 6 and 8) which extends over collar 27 to protect the joint. Corresponding collar 28 is journaled similarly on annular ribs 46 of spacing collar 47, seal 48 being seated between said ribs and engaging said collar. Thrust ring 49 is interposed between casting 31 and collar 47. Said collar 47 is recessed at its right end to receive bracket 11 and cap 12, and is provided with vertical flange 51 which is bolted to brace channel 9. Overhanging shield 52 of said collar extends over collar 28 to protect the joint.

In assembly, channel 9 is located with respect to axle 4 and secured thereto by bracket 11 and cap 12, collar 47 having seal 48 is then bolted to channel 9 and thrust ring 49 is then put in place. Wheel 21 is mounted on axle 4 after which thrust ring 39 and collar 37 are placed thereon. Thereafter channel 2 and bracket 15 are bolted to collar 37 and cap screw 18 is tightened to secure axle 4 with respect to the assembly.

Wheel 22 (Fig. 5) is mounted similarly on axle 4 between brace channel 10 and side channel 3. Thus it is seen that side channels 2, 3, arched channel 6, brace channels 9, 10, and axle 4 form a rigid rear section of the frame which is supported on fluid-containing wheels mounted on the axle.

The front section of the frame comprises side channels 60, 61 (Fig. 2) which have short longitudinal rear portions 62, 63, sharply converging middle portions 64, 65, and, gradually converging front portions 66, 67, which are joined at their ends by connection 68 riveted therebetween. Connection 68 is apertured to receive draft bolt 69.

Spring 71 on bolt 69 is held between a nut on said bolt and a washer adjacent connection 68 and provides a resilient draft connection. At its front end, draft bolt 69 has a transverse pivotal connection about pin 73 with draft link 74 which has a vertical pivotal connection about pin 75 with drawbar 76 of track-type tractor 77. Thus it is seen that a universal resilient draft connection is provided from the tractor to the scraper frame. Middle portions 64, 65 of side channels 60, 61 are connected by cross brace 80 secured thereto by gussets 81, 82, respectively. Plates 83, 84 (Figs. 1 and 2) are riveted to the top and bottom flanges of front portions 66, 67, respectively, and serve to reinforce the front section of the frame.

Bracket 86 (Figs. 1 and 2) is mounted on the front frame section to support an adjustable connection to arched channel 6 of the rear frame section. Said bracket 86 has substantially vertical rear legs 87, 88 terminating in an integral base 89 which is bolted to plate 83 and side channels 60, 61, and inclined front leg 90 which is bolted at its base 91 to plate 83 and side channels 60, 61 adjacent the front ends thereof.

The front and rear frame sections are provided with a pivotal connection and an adjustable connection whereby the angular relation between the sections is varied by varying the length of the adjustable connection, thereby oscillating said frame section and raising or lowering the pivotal connection therebetween.

To provide the pivotal connection, the respective side channels of the frame sections are provided with aligned pivotal joints. Side channels 3 and 61 (Figs. 1 and 2) have brackets 100, 101 riveted thereto. Bracket 100 extends forwardly from channel 3, and apertured boss 102 formed at the end thereof is positioned between apertured ears 103 on bracket 101 which extends rearwardly from rear portion 63 of side channel 61. Pin 104 passes through ears 103 and boss 102 to complete the connection. The front end of side channel 2 (Fig. 2) and rear portion 62 of side channel 60 are connected similarly by brackets 106, 107, and pin 108, which is in axial alignment with said pin 104. Thus a pivotal connection is provided between the front and rear sections of the frame.

The adjustable connection between the sections of the frame comprises telescopic links 111, 112 (Figs. 1 and 2) which are adjustable telescopically by means hereinafter described. Connection 113 (Fig. 7) welded on link 111 has transversely aligned journals 114 adapted to receive trunnions 115 pinned in apertured bosses 116 of bracket 117 (Figs. 1 and 2) centrally mounted on arched channel 6. Connection 121 (Fig. 7) having threaded engagement with link 112 at 122 has transversely aligned journals 123 adapted to receive trunnions 124 pinned in apertured bosses 125 of bracket 86 (Figs. 1 and 2).

Thus the front and rear sections of the frame have a pivotal connection and an adjustable connection whereby the angular relation therebetween may be varied by relatively adjusting said section. Such relative adjustment raises or lowers the pivotal connection between the frame sections, and, as the scraper is mounted revolubly in the frame adjacent the pivotal connection, the scraper is adjustable vertically by movement thereof.

Scraper 1 comprises end plates 131, 132 (Fig. 2), bowl 133, and blade 134. End plates 131, 132 are joined to bowl 133 by angles 136, 137. Blade 134 extends along the front lower edge of bowl 133 and has its ends secured between the horizontal flanges of said angles 136, 137 and bowl 133. The upper edge of bowl 133 is reinforced by angle 138 riveted thereto and the front edges of end plates 131, 132 are reinforced by angles 139, 140, guard plates 141, 142, being riveted to the front flange of said angles. Three longitudinal wear plates 146 (Figs. 1 and 5) are provided on the under side of bowl 133 and said plates terminate rearwardly at cross brace 147 (Fig. 5) being riveted thereto and to bowl 133.

Said scraper 1 is mounted revolubly in side channels 2, 3, adjacent the forward ends thereof, being substantially as wide as the distance between said channels. Brackets 151, 152 (Fig. 2) bolted on opposite sides of end plate 132 have aligned apertures in which trunnion 153 is journaled. Said trunnion 153 is pinned in bracket 154 (Figs. 1 and 2) on side channel 3, whereby the right end of the scraper is revolubly mounted. Bracket 152 extends downwardly to brace end plate 132. The left end of said scraper is similarly mounted adjacent the front end of side channel 2, trunnions 153 being axially aligned. Thus it is seen that the scraper is freely rotatable about an axis adjacent the pivotal connection between the front and rear frame section. Thus the scraper is adjustable about its pivotal supports, and is adjustable vertically.

Power-operated means are provided for controlling the vertical position of the scraper by varying the operative length of the telescopic links which connect the front and rear frame sections. Link 111 (Fig. 7) comprises cylindrical shield 160 having cap 161 threaded on the rear end thereof at 162 and internally screw threaded nut 163 threaded in the front end thereof at 164. Link 112 comprises cylindrical shield 166 having sleeve 167 mounted in the rear end thereof and engaging shield 160, oil seals 168 being seated in said sleeve 167. Screw 169 journaled in connection 121 is fixed longitudinally with respect thereto by collar 170 and fork 171 (Fig. 1) pinned thereon on opposite sides of said connection. Said screw 169 (Fig. 7) has screw threaded engagement with the internal threads of nut 163. As link 111 and nut 163 are held against rotation or longitudinal movement with respect to connection 113 and arched channel 6, and as link 112 and screw 169 are held against longitudinal movement with respect to connection 121 and bracket 86, rotation of screw 169 serves to adjust links 111, 112 telescopically to vary their operative length between the front and rear frame sections thereby raising or lowering the pivotal connection therebetween and scraper 1. Thus the vertical position of scraper 1 is adjustable to determine the depth of cut if it is in loading position, or the depth of spread if it is in dumping position. This adjustment also serves to determine whether the load is carried on the wheels or is dragged on the ground.

The adjusting means for causing telescopic movement of the links is operated by power from the tractor engine. Fork 171 (Fig. 1) forms part of universal joint 172 between screw 169 and telescopic shaft 173 which is connected by universal joint 174 with power take-off shaft 175 of tractor 77. Shaft 175 is driven selectively in either direction from the tractor engine through reversible clutch mechanism controlled by lever 176 at the operator's station. Said clutch mechanism may be of the type disclosed in application Serial No. 484,366, filed September 25, 1930, by Carl A. Gustafson, for Road working apparatus. Thus the operator can control vertical adjustment of the scraper by power derived from the tractor engine.

The scraper is adapted to be latched in any one of a plurality of rotated positions for various operations, or it is releasable for free rotation. Spaced angles 180, 181 (Fig. 5) are secured to the rear part of bowl 133, and arched straps 182, 183, 184 have their bent ends secured to said angles. Straps 182, 183 are adjacent the top of the scraper and serve as latching stations to hold the scraper in adjusted position for use in loading and carrying, while strap 184 adjacent the bottom of the scraper serves as a latching station to hold the scraper in position for dumping or distributing. Latching means are provided for engaging any selected latching station to hold the scraper in its rotated, adjusted position. T-bar 186 (Figs. 1 and 5) has its rear end secured to bracket 187 (Figs. 3 and 5) which is rotatably mounted on axle 4 between collars 188 clamped on said axle. Adjacent its upper end, T-bar 186 (Fig. 1) has lugs 189 secured thereto and said lugs 189 form spaced jaws adapted to engage an aligned strap to hold the scraper in adjusted position. As the pivotal support of said scraper is placed to the rear of its center of gravity, the front end of the scraper falls toward or into engagement with the ground when the scraper is not restrained, and, if the machine is in motion rotates in a clockwise direction until restrained by the latching means which normally falls into latching position. Thus, if the latch is released when the scraper is loaded, automatic dumping is accomplished by virtue of the uneven weight distribution with respect to the pivot means or pivotal support for the scraper and because of the mounting of the scraper for free rotation. After dumping the load, the scraper will continue to rotate, if in contact with the ground, until the latch is made effective. Movement of T-bar 186 to control latching or unlatching of the scraper is controlled by cord 190 secured to the front end thereof. Said cord extends up over sheave 191 (Figs. 1 and 5) in clevis 192 supported from channel 6 and forward to the tractor to which it is secured adjacent the operator's seat.

In operation, the position of the scraper is controlled by releasing the latch therefrom and permitting it to roll in a clockwise direction as the machine moves forward until it is in the position desired for operation when the latch bar is again lowered to maintain the adjustment.

In Figs. 9 to 17, the operation of the scraper is illustrated in its various possible adjustments. For convenience in describing these figures, the following reference letters will be used. The rear section of the frame is denoted generally at A and includes side channels 2, 3, arched channel 6 and related parts, while the front section of the frame B includes side channels 60, 61, bracket 86 and related parts. Telescopic links 111, 112, are connected to rear section A at C and to front section B at D while the pivotal connection between the lower portions of the front and rear sections is indicated at E. Straps 182, 183, 184 which serve as latching stations to determine the angular adjustment of the scraper are indicated at F, G and H, respectively, while T-bar 186 comprising the latching means cooperating therewith is indicated at L.

In Figs. 9 to 11 latch bar L is engaged with the upper latching station F. In Fig. 9 the operative length of the telescopic links between points C and D is adjusted so that pivotal connection E between frame sections A and B is substantially aligned with the lower horizontal frame members thereof. In this position the scraper is adjusted for a light cut which serves to plane a shallow layer of material from the surface of the earth. In Fig. 10 the operative length between points C and D is decreased slightly, bringing the upper portions of frame sections A and B closer together and lowering pivot point E. In this position the scraper makes a deeper cut than in the position shown in Fig. 9 but still has an advantageous shearing angle with the surface of the ground. In Fig. 11 the scraper is shown raised to carrying position, the telescopic links having been extended to obtain a maximum distance between points C and D and pivot point E being raised so that the scraper is positioned to carry a maximum load.

In Figs. 12–14, inclusive, latch member L is engaged with latching station G for use in looser material where less cutting action is required. Fig. 12 illustrates the position of the scraper when a light cut is being made, while in Fig. 13 the scraper has been lowered to make a deep cut. It is to be noted that in Fig. 13 the frame sections of the scraper are adjusted as in Fig. 10, the deeper cut being obtained by engaging latching means L with latching station G. In Fig. 14 the scraper is raised to load-carrying position for hauling the material some distance before dumping.

In Figs. 15 and 16 latch member L is engaged with latching station H to position the scraper for dumping or distributing operations. In Fig. 15 the height of the scraper is so adjusted that the material is spread thinner over a considerable area, while in Fig. 16 the scraper is elevated so that the material is dumped quickly. As described above, when latch member L is released, the scraper will move automatically from a position similar to that illustrated in Figs. 11 and 14 to a dumping position as shown in Figs. 15 and 16.

Fig. 17 illustrates the position of the scraper immediately after dumping, the wheels being slightly raised from the ground, while the scraper is being rotated in a clockwise direction due to its engagement with the ground. As the machine moves forward, the scraper continues rotating until latching station F is aligned with latch bar L when the scraper is again latched in loading position.

Various intermediate adjustments are possible other than those illustrated in Figs. 9 to 16, and it is seen that the wide range of adjustment of the scraper allows the operator to select the position of the scraper best suited for the job to be done. Further, it is seen that the scraper is positively held in any adjusted position so that an even cut or spread is always obtained.

I, therefore, claim as my invention:

1. In a road machine, a frame comprising front and rear sections, said front section including side members having parallel rear end portions and converging front portions, and a bracket mounted on said front portions, said rear section comprising parallel side members, an axle connecting said members adjacent their ends, and an arched cross member connecting said members adjacent their front ends, brackets forming pivotal connections between the side members of said front and rear sections, and a telescopic link pivotally connected to said bracket and said arched cross member.

2. In a road machine, a frame including opposite horizontal side members, an axle connecting the rear ends of said members, an arched cross member connecting the front ends of said members, bracing members having their front ends connected to said cross member centrally thereof and diverging rearwardly, the rear ends of said members being connected to said axle, wheels journaled on said axles adjacent the ends thereof, said side members and said bracing members serving to locate said wheels on said axle, and a scraper revolubly mounted in said side members.

3. In a road machine, a frame comprising front and rear sections, said front section comprising side members having parallel rear portions, sharply converging central portions, and gradually converging front portions, a brace connecting said central portions, plates connecting said front portions, a longitudinally apertured draft connection secured between the front ends of said members, a draft bolt in said connection and resiliently connected thereto, a bracket mounted on said front section, said rear section comprising parallel side members pivotally connected at the front to said front section side members, an axle connecting the rear ends of said parallel members, an arched cross member connecting the front ends of said parallel members, bracing members having their adjacent front ends connected to said cross member centrally thereof and their spaced rear ends connected to said axle, a second bracket centrally mounted on said cross member, telescopically adjustable links comprising threaded members, one of said links being pivotally mounted in said first bracket and the other of said links being pivotally mounted in said second bracket, wheels mounted on said axle adjacent the ends thereof, said parallel side members and said bracing members serving to locate said wheels by means including collars on said axle and secured to said members and having shields overhanging the hubs of said wheels, each wheel comprising a hub, spaced disks, and a tire, forming an oil chamber, each hub having a central oil chamber and oil feeding grooves.

CARL O. WOLD.